US012452336B2

(12) United States Patent
Xia et al.

(10) Patent No.: US 12,452,336 B2
(45) Date of Patent: Oct. 21, 2025

(54) DATA TRANSMISSION METHOD, APPARATUS, AND SYSTEM

(71) Applicant: Shenzhen Yinwang Intelligent Technologies Co., Ltd., Shenzhen (CN)

(72) Inventors: Bing Xia, Shanghai (CN); Xian Qin, Shanghai (CN); Yong Shuai, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/467,470

(22) Filed: Sep. 14, 2023

(65) Prior Publication Data

US 2024/0007532 A1 Jan. 4, 2024

Related U.S. Application Data

(63) Continuation of application No. PCT/CN2021/080885, filed on Mar. 15, 2021.

(51) Int. Cl.
*H04L 67/12* (2022.01)
*H04L 69/18* (2022.01)

(52) U.S. Cl.
CPC .............. *H04L 67/12* (2013.01); *H04L 69/18* (2013.01)

(58) Field of Classification Search
None
See application file for complete search history.

(56) References Cited

U.S. PATENT DOCUMENTS 9,277,370 B2 * 3/2016 Addepalli ............. H04W 76/45
10,268,203 B2 * 4/2019 Wisniowski ......... G05D 1/0246
10,430,603 B2 * 10/2019 Hrabak ............... G06F 21/6218
10,935,973 B2 * 3/2021 Pedersen .............. G08G 1/0116
2014/0133350 A1 * 5/2014 Triess ................... G06F 13/385 370/254
2018/0247067 A1 * 8/2018 Hrabak ............... G06F 21/6218
(Continued)

FOREIGN PATENT DOCUMENTS

CN 106454225 A 2/2017
CN 206100302 U 4/2017
(Continued)

OTHER PUBLICATIONS

Schulzrinne et al., "Real Time Streaming Protocol (RTSP)," Network Working Group Request for Comments: 2326, Total 92 pages (Apr. 1998).

(Continued)

*Primary Examiner* — Ranodhi Serrao
(74) *Attorney, Agent, or Firm* — Leydig, Voit & Mayer, Ltd.

(57) ABSTRACT

This application provides a data transmission method, apparatus, and a system. The data transmission method includes: A first controller receives a data obtaining request from a second controller, where the data obtaining request requests to obtain data of a first sensor, the first controller supports a data interface corresponding to the first sensor, and the second controller does not support the data interface corresponding to the first sensor; the first controller receives first data from the first sensor; and the first controller sends converted first data to the second controller according to a first communication protocol. In this way, a second electronic apparatus can obtain data from the first sensor from a first electronic apparatus. This helps avoid redundant sensor configuration.

12 Claims, 8 Drawing Sheets

Communication system 100

First sensor 111
First solver 112
First controller 110
Operating system 1

Second sensor 121
Second solver 122
Second controller 120
Operating system 2

(56) References Cited

U.S. PATENT DOCUMENTS

| | | | | |
|---|---|---|---|---|
| 2018/0307238 | A1* | 10/2018 | Wisniowski | G01S 17/86 |
| 2019/0155769 | A1* | 5/2019 | Levy | G06F 13/38 |
| 2019/0191015 | A1* | 6/2019 | Tessiore | H04L 67/10 |
| 2019/0222984 | A1* | 7/2019 | Prabhudeva | H04W 4/44 |
| 2019/0235521 | A1* | 8/2019 | Mudalige | G05D 1/0248 |
| 2019/0250611 | A1* | 8/2019 | Costin | G05D 1/0242 |
| 2020/0064831 | A1* | 2/2020 | Pedersen | G01C 21/26 |
| 2021/0065473 | A1* | 3/2021 | Diehl | G05D 1/0055 |
| 2021/0096571 | A1* | 4/2021 | Modalavalasa | G07C 5/0816 |
| 2022/0126864 | A1* | 4/2022 | Moustafa | B60W 60/0011 |
| 2022/0150090 | A1* | 5/2022 | Margosian | H04L 12/40143 |

FOREIGN PATENT DOCUMENTS

| | | | |
|---|---|---|---|
| CN | 210745353 | U | 6/2020 |
| CN | 111432356 | A | 7/2020 |
| CN | 112165480 | A | 1/2021 |
| JP | 2013013049 | A | 1/2013 |
| JP | 2017212726 | A | 11/2017 |
| JP | 2020112994 | A | 7/2020 |

OTHER PUBLICATIONS

Handley et al., “SDP: Session Description Protocol,” Network Working Group Request for Comments: 2327, Total 42 pages (Apr. 1998).

Schulzrinne et al., “RTP: A Transport Protocol for Real-Time Applications.”Network Working Group Request for Comments: 3550, Total 89 pages (Jul. 2003).

Handley et al., “SDP: Session Description Protocol,” Network Working Group Request for Comments: 4566, Total 49 pages (Jul. 2006).

* cited by examiner

DATA TRANSMISSION METHOD, APPARATUS, AND SYSTEM

CROSS-REFERENCE TO RELATED APPLICATIONS

This application is a continuation of International Application No. PCT/CN2021/080885, filed on Mar. 15, 2021, the disclosure of which is hereby incorporated by reference in its entirety.

TECHNICAL FIELD

This application relates to the field of internet of vehicles technologies, and in particular, relates to a data transmission method and apparatus, and a system.

BACKGROUND

With continuous development of intelligent vehicles, more types and quantities of sensors are installed on the intelligent vehicles. To better implement internal control of an in-vehicle system of an intelligent vehicle, a plurality of controllers may be disposed in the intelligent vehicle. One controller may obtain and utilize data from one or more sensors. However, for one sensor, a data interface of the sensor may not adapt to a plurality of controllers. If a data protocol supported by the controller is incompatible with the data interface of the sensor, the controller cannot obtain data of the sensor.

SUMMARY

Implementations of this application provide a data transmission method and a system.

According to a first aspect, this application provides a data transmission method, including: A first controller receives a data obtaining request from a second controller, where the data obtaining request requests to obtain data of a first sensor, the first controller supports a data interface corresponding to the first sensor, and the second controller does not support the data interface corresponding to the first sensor;

the first controller receives first data from the first sensor; and the first controller sends converted first data to the second controller according to a first communication protocol.

In the technical solution of this application, the first controller may send the converted data obtained based on the data of the first sensor to the second controller according to a first protocol in response to the data obtaining request sent by the second controller. In this way, the second controller can obtain the data of the first sensor from the first controller. This helps simplify hardware configuration of an in-vehicle system and avoid redundant sensor configuration.

It may be understood that the second controller does not support a communication protocol used by the data interface corresponding to the first sensor. In this application, the first communication protocol is a communication protocol supported by both the first controller and the second controller. The first controller and the second controller may transmit data of a sensor between each other according to the first communication protocol.

The second controller may receive data from the first sensor from the first controller, and parse the received data according to the first communication protocol.

Optionally, the first communication protocol may be, but is not limited to one of a real-time streaming protocol, a real-time transport protocol, a user datagram protocol, or a transmission control protocol.

Optionally, before that the first controller receives first data from the first sensor, and after the first controller receives the data obtaining request of the second controller, the first controller may first determine whether the second controller supports a data interface corresponding to the first data.

If the first controller determines that the second controller does not support the data interface corresponding to the first data, the first controller receives the first data from the first sensor, and sends converted first data to the second controller according to the first communication protocol.

If the first controller determines that the second controller supports the data interface corresponding to the first data, the first controller may send an instruction to the second controller, to instruct the second controller to receive data from the first sensor from a first solver through the data interface corresponding to the first data.

Alternatively, if the first controller determines that the second controller supports the data interface corresponding to the first data, the first sensor sends an instruction to a first solver, to instruct the first solver to send the data of the first sensor to the second controller.

It can be learned that in such a solution, when the second controller does not support the data interface corresponding to the first data, the second controller obtains the data from the first sensor through the first controller. The first controller may be understood as an "intermediate" for data transmission. When the second controller supports the data interface corresponding to the first data, the second controller may directly receive the data from the first sensor from the first solver connected to the first sensor through the data interface corresponding to the first data.

In some implementations, that the first controller receives first data from the first sensor includes: The first controller obtains the first data from a first solver through the data interface corresponding to the first sensor, where the first data is obtained by the first solver by performing solving on data collected by the first sensor. In this way, the first solver can process the data output by the first sensor into data that can be supported by the first controller, so that the first controller can obtain the data of the first sensor.

According to a second aspect, this application further provides a data transmission method, including:

A second controller sends a data obtaining request to a first controller, where the data obtaining request requests to obtain data of a first sensor, the first controller supports a data interface corresponding to the first sensor, and the second controller does not support the data interface corresponding to the first sensor; and the second controller receives data sent by the first controller according to a first communication protocol.

According to the technical solution of this application, when the second controller does not support the data interface corresponding to the first sensor, the second controller can obtain data from the first sensor from the first controller by sending the data obtaining request to the first controller. This helps simplify hardware configuration of an in-vehicle system and avoid redundant sensor configuration.

It may be understood that the first communication protocol is a communication protocol supported by both the first controller and the second controller. The first controller and the second controller may transmit data of a sensor between each other according to the first communication protocol.

The second controller may receive the data from the first sensor from the first controller, and parse the received data according to the first communication protocol.

Optionally, the first communication protocol may be, but is not limited to one of a real-time streaming protocol, a real-time transport protocol, a user datagram protocol, or a transmission control protocol.

According to a third aspect, this application further provides a data transmission method, applied to a communication system, where the communication system includes a first controller, a second controller, and a first sensor. The first controller supports a data interface corresponding to the first sensor, and the second controller does not support the data interface corresponding to the first sensor. The data transmission method includes:

The second controller sends a data obtaining request to the first controller, where the data obtaining request requests to obtain data of the first sensor;

- the first controller obtains first data from the first sensor in response to the data obtaining request; and
- the first controller sends converted first data to the second controller according to a first communication protocol.

According to the technical solution of this application, when the second controller does not support the data interface corresponding to the first sensor, the second controller can obtain data from the first sensor from the first controller by sending the data obtaining request to the first controller. This helps simplify hardware configuration of an in-vehicle system and avoid redundant sensor configuration.

Optionally, the first communication protocol may be, but is not limited to, one of a real-time streaming protocol, a real-time transport protocol, a user datagram protocol, or a transmission control protocol.

In some implementations, the communication system further includes a first solver. That the first controller obtains first data from the first sensor in response to the data obtaining request includes: The first controller obtains the first data from the first solver through the data interface corresponding to the first sensor, where the first data is obtained by the first solver by performing solving on data collected by the first sensor. In this way, the first solver can process the data output by the first sensor into data that can be supported by the first controller, so that the first controller can obtain the data of the first sensor.

According to a fourth aspect, this application further provides a data transmission apparatus, including a transceiver unit and a processing unit, where the processing unit is configured to control the transceiver unit to:

- receive a data obtaining request from a second controller, where the data obtaining request requests to obtain data of a first sensor, the data transmission apparatus supports a data interface corresponding to the first sensor, and the second controller does not support the data interface corresponding to the first sensor;
- receive first data from the first sensor; and
- send converted first data to the second controller according to a first communication protocol.

In the technical solution of this application, the data transmission apparatus may send the converted data obtained based on the data of the first sensor to the second controller according to the first protocol in response to the data obtaining request sent by the second controller. In this way, the second controller can obtain data from the first sensor from the first controller. This helps simplify hardware configuration of an in-vehicle system and avoid redundant sensor configuration.

It may be understood that the data transmission apparatus may be or may be deployed in the first controller in the foregoing communication system.

In some implementations, in terms of receiving the first data from the first sensor, the transceiver unit is configured to:

- obtain the first data from a first solver through the data interface corresponding to the first sensor, where the first data is obtained by the first solver by performing solving on data collected by the first sensor.

In some implementations, the first communication protocol is one of a real-time streaming protocol, a real-time transport protocol, a user datagram protocol, or a transmission control protocol.

It should be understood that the foregoing related supplementary descriptions and technical effects of the data transmission method are also applicable to the data transmission apparatus, and details are not described herein again.

According to a fifth aspect, this application further provides a data transmission apparatus, including a transceiver unit and a processing unit, where the processing unit is configured to control the transceiver unit to:

- send a data obtaining request to a first controller, where the data obtaining request requests to obtain data of a first sensor, the first controller supports a data interface corresponding to the first sensor, and the data transmission apparatus does not support the data interface corresponding to the first sensor; and
- receive data from the first controller according to a first communication protocol.

According to the technical solution of this application, when the data transmission apparatus does not support the data interface corresponding to the first sensor, the data transmission apparatus can obtain the data from the first sensor from the first controller by sending the data obtaining request to the first controller. This helps simplify hardware configuration of an in-vehicle system and avoid redundant sensor configuration.

It may be understood that the data transmission apparatus may be or may be deployed in the second controller in the foregoing communication system.

In some implementations, the first communication protocol is one of a real-time streaming protocol, a real-time transport protocol, a user datagram protocol, or a transmission control protocol.

It should be understood that the foregoing related supplementary descriptions and technical effects of the data transmission method are also applicable to the data transmission apparatus, and details are not described herein again.

According to a sixth aspect, this application further provides a first electronic apparatus, including a first interface circuit, a second interface circuit, and a controller. The first electronic apparatus may be the foregoing first controller, or may be a chip or a chip system, or may be an independent electronic device.

The first interface circuit is configured to receive a data obtaining request from a second electronic apparatus, the data obtaining request requests to obtain data of a first sensor, and the second electronic apparatus does not support a protocol of a data interface of the first sensor. The second interface circuit is configured to receive first data from the first sensor.

In terms of the controller, in a possible implementation, the controller is configured to enable the first interface circuit to send converted first data to the second electronic apparatus according to a first communication protocol.

In another possible communication, the controller is configured to convert the first data into second data according to a first communication protocol, where the second electronic apparatus supports a protocol corresponding to the second data; and the first interface circuit is further configured to send the second data to the second electronic apparatus.

According to the technical solution of this application, the first electronic apparatus may send the second data or converted data obtained based on the data of the first sensor to the second electronic apparatus according to the first protocol in response to the data obtaining request sent by the second electronic apparatus. In this way, the second electronic apparatus can obtain data from the first sensor from the first electronic apparatus. This helps simplify hardware configuration of an in-vehicle system and avoid redundant sensor configuration.

Optionally, the first communication protocol may be, but is not limited to, one of a real-time streaming protocol, a real-time transport protocol, a user datagram protocol, or a transmission control protocol.

Optionally, in terms of receiving the first data from the first sensor, the second interface circuit is configured to obtain the first data from a first solver through the data interface corresponding to the first sensor, where the first data is obtained by the first solver by performing solving on data collected by the first sensor.

It should be understood that the foregoing related supplementary descriptions and technical effects of the data transmission method are also applicable to the first electronic apparatus in this application, and details are not described herein again.

According to a seventh aspect, this application further provides a second electronic apparatus, including a controller and an interface circuit. The second electronic apparatus may be the foregoing second controller, or may be a chip or a chip system, or may be an independent electronic device.

The controller is configured to enable the interface circuit to send a data obtaining request to a first electronic apparatus, where the data obtaining request requests to obtain data of a first sensor. The first electronic apparatus supports a data interface corresponding to the first sensor, and the second electronic apparatus does not support the data interface corresponding to the first sensor.

The controller is further configured to receive data from the first sensor according to a first communication protocol through the interface circuit, for example, receive second data or converted first data from the first electronic apparatus.

According to the technical solution of this application, when the second electronic apparatus does not support the data interface corresponding to the first sensor, the second electronic apparatus can obtain the data from the first sensor from the first electronic apparatus by sending the data obtaining request to the first electronic apparatus. This helps simplify hardware configuration of an in-vehicle system and avoid redundant sensor configuration.

It should be understood that the foregoing related supplementary descriptions and technical effects of the data transmission method are also applicable to the second electronic apparatus in this application, and details are not described herein again.

According to an eighth aspect, this application further provides a communication system, where the communication system includes the first electronic apparatus according to the fourth aspect and the second electronic apparatus according to the fifth aspect.

According to a ninth aspect, this application further provides an electronic device, including a processor, where the processor is coupled to a memory, the memory is configured to store computer instructions, and the processor executes the computer instructions, so that the communication device performs the method in any one of the possible implementations of the first aspect or the second aspect.

According to a tenth aspect, this application further provides a computer program product. The computer program product includes a computer program (which may also be referred to as code or instructions). When the computer program is run, a computer performs the method in any one of the possible implementations of the first aspect or the second aspect.

According to an eleventh aspect, this application provides a computer-readable storage medium. The computer-readable storage medium stores a computer program (which may also be referred to as code or instructions). When the computer program is runs on a computer, the computer performs the method in any one of the possible implementations of the first aspect or the second aspect.

BRIEF DESCRIPTION OF DRAWINGS

FIG. TA is a schematic diagram of a network architecture of a vehicle system according to an embodiment of this application.

DESCRIPTION OF EMBODIMENTS

The following describes embodiments of the present invention with reference to the accompanying drawings in embodiments of the present invention.

For example, FIG. TA is a schematic diagram of a system architecture of a vehicle 100. The vehicle 100 includes a plurality of vehicle integration units (vehicle integration unit, VIU) 11, a communication box (T-BOX) 12, a cockpit domain controller (CDC), a mobile data center (MDC) 14, and a vehicle domain controller (VDC) 15.

The vehicle 100 further includes a plurality of types of sensors disposed on the vehicle, for example, a laser radar, a millimeter-wave radar, an ultrasonic radar, and a camera apparatus. Each type of sensor may include a plurality of sensors. It should be understood that a person skilled in the art may properly select a type, a quantity, and a location layout of the sensors based on a requirement.

Figure 1A:
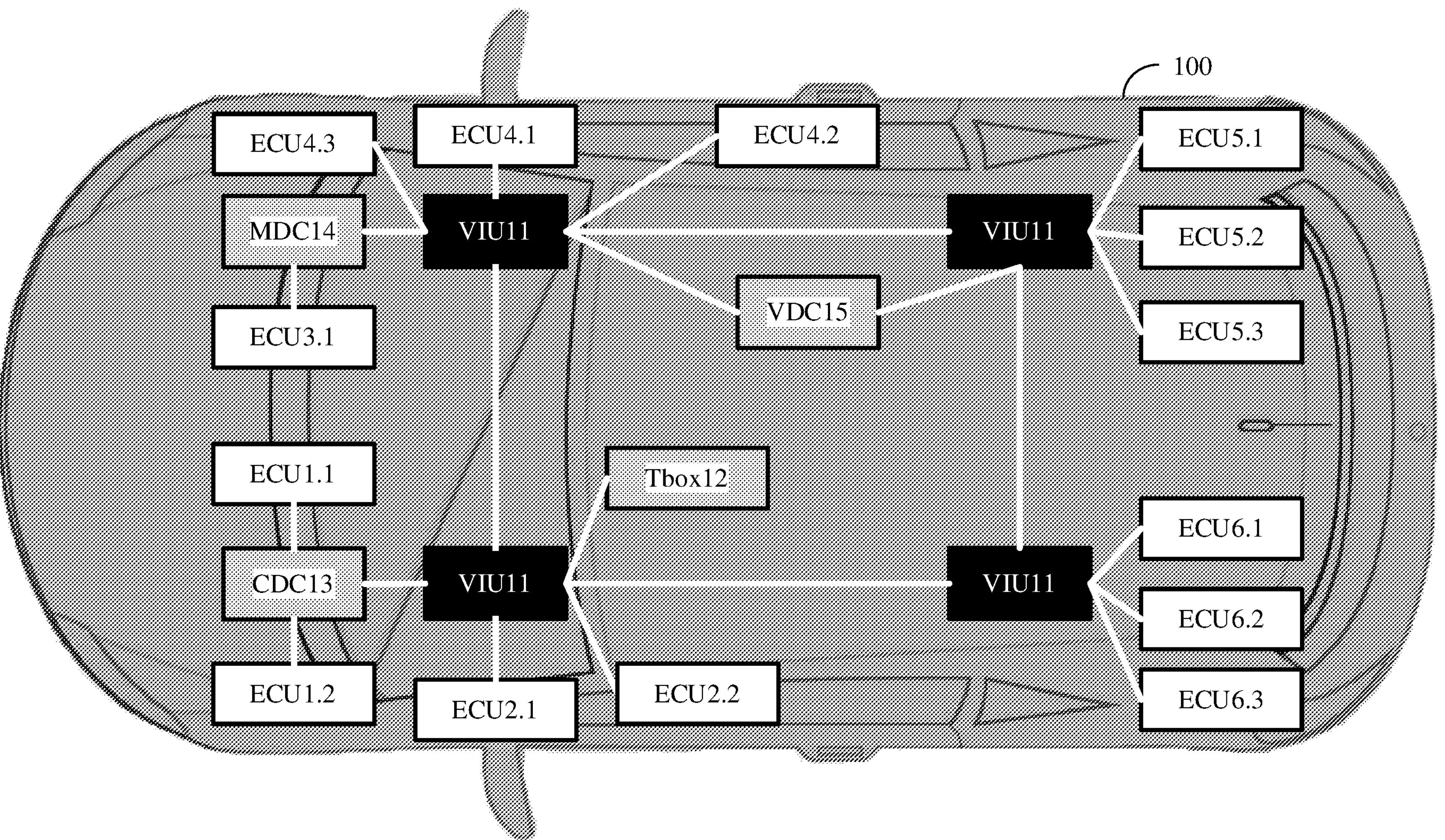
FIG. 1B is a schematic diagram of an architecture of a communication system.
FIG. 1C is a schematic diagram of an architecture of a communication system according to an embodiment of this application.

FIG. 1A shows four VIUs. It should be understood that a quantity and locations of the VIUs in FIG. TA are only an example, and a person skilled in the art may select a proper quantity and locations of the VIUs based on an actual requirement.

The vehicle integration unit VIU 11 provides a plurality of vehicle parts with some or all data processing functions or control functions required by the vehicle parts. The VIU provides one or more of the following functions:

1. Electronic control function: The VIU is used to implement some or all electronic control function provided by electronic control units (ECU) inside the foregoing vehicle parts. For example, the electronic control function is a control function required by a specified vehicle part. For another example, the electronic control function is a data processing function required by a specified vehicle part.

2. Function that is the same as that of a gateway: The VIU may further have some or all functions that are the same as those of the gateway, for example, a protocol conversion function, a protocol encapsulation and forwarding function, and a data format conversion function.

3. Data processing function across vehicle parts: The data processing function across vehicle parts is used to process and calculate data obtained from executors in the plurality of vehicle parts.

It should be noted that the data involved in the foregoing functions may include running data of the executor in the vehicle part, for example, a motion parameter of the executor and a working status of the executor. The data involved in the functions may further be data collected by using a data collection unit (for example, a sensitive element) of the vehicle part. For example, the data may be road information that is of a road on which a vehicle travels and that is collected by using the sensitive element of the vehicle, weather information, or the like. This is not limited in embodiments of this application.

In an example of the vehicle 100 in FIG. TA, the vehicle 100 may be divided into a plurality of domains, and each domain has an independent domain controller, in FIG. TA, two domain controllers are shown: the cockpit domain controller CDC 13 and the vehicle domain controller VDC 15.

The cockpit domain controller CDC 13 may be configured to implement function control of a cockpit area of the vehicle 100. Vehicle parts in the cockpit area may include a head-up display apparatus (HUD), a dashboard, a radio, a central control screen, a navigation component, a camera, and the like.

The vehicle domain controller VDC 15 may be configured to coordinate and control a power battery and an engine of the vehicle, to improve power performance of the vehicle 100. In some embodiments, the vehicle domain controller 15 in FIG. TA may implement various functions of a VDC.

FIG. TA further shows the internet of vehicles device T-BOX 12 and the mobile data center MDC 14. The T-BOX 12 may be configured to implement communication connections between the vehicle 100 and an internal device of the vehicle and between the vehicle 100 and an external device. The T-BOX may obtain vehicle-mounted device data through a bus of the vehicle 100, or may be communicatively connected to a mobile phone of a user through a wireless network. In some embodiments, the T-BOX 12 may be included in a communication system in FIG. TA. The mobile data center MDC 14 is configured to output execution control instructions such as a driving instruction, a transmission instruction, a steering instruction, and a braking instruction based on core control algorithms such as an environment sensing and positioning algorithm, an intelligent planning and decision-making algorithm, and a vehicle motion control algorithm, to implement automatic control of the vehicle 100, and further implement man-machine interaction of vehicle driving information through a man-machine interaction interface. In some embodiments, a computing platform 150 in FIG. TA may implement various functions of the MDC 14.

Four VIUs 11 in FIG. TA form a ring topology connection network, each VIU 11 is communicatively connected to a sensor at a location nearby the VIU 11, and the T-BOX 12, the CDC 13, the MDC 14, and the VDC 15 are communicatively connected to the ring topology connection network of the VIUs. The VIU 11 may obtain information from each sensor, and report the obtained information to the CDC 13, the MDC 14, and the VDC 15. Through the ring topology network, the T-BOX 12, the CDC 13, the MDC 14, and the VDC 15 may also implement communication with each other.

It should be understood that, the ring topology connection network is only an example, and a person skilled in the art may select another proper VIU connection manner based on a requirement.

The VIUs may be connected with each other by using, for example, the Ethernet (ethernet), the VIUs may be connected to the T-BOX 12, the CDC 13, the MDC 14, and the VDC 15 by using, for example, an Ethernet or peripheral component interconnect express (PCIe) technology, and the VIUs may be connected to the sensors by using, for example, a controller area network (CAN), a local interconnect network (LIN), FlexRay, or media-oriented system transport (MOST).

Figure 1B:
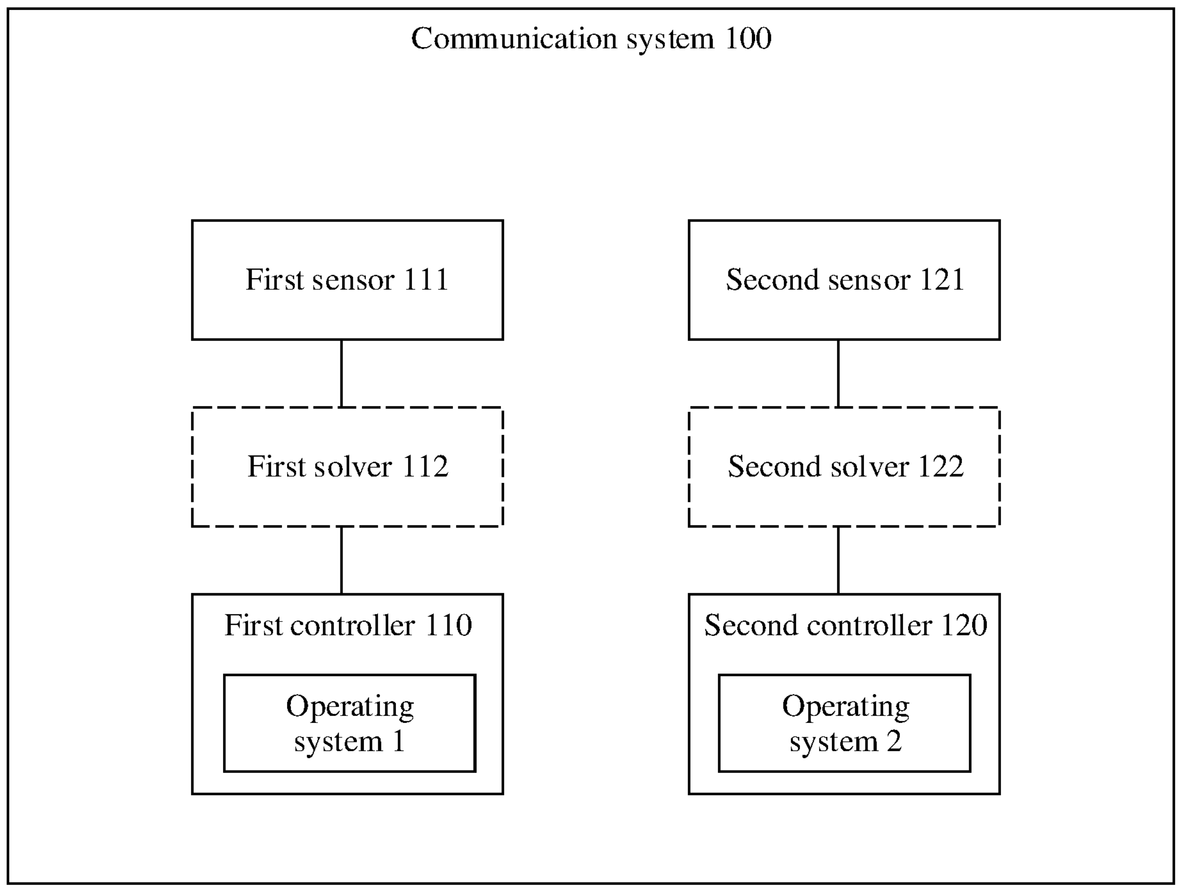

FIG. 1B is a schematic diagram of a network architecture of a communication system according to an embodiment. The communication system 100 may be deployed in the system shown in FIG. TA. The communication system 100 includes a first controller 110, a second controller 120, and a first sensor 111. The first controller 110 supports a data interface corresponding to the first sensor 111. The second controller 120 does not support the data interface corresponding to the first sensor 111. The first controller 110 may be, for example, the VDC 15 in FIG. TA, and the second controller 120 may be, for example, the CDC 13 in FIG. TA.

Optionally, the communication system 100 may further include a first solver 112. Data collected by the first sensor 111 is processed by the first solver 112 into first data, where the first data is data that conforms to a data type of the data interface corresponding to the first sensor. The first controller 110 obtains, through the data interface corresponding to the first sensor 111, the first data that is output by the solver 112 and that is from the first sensor 111.

Optionally, the communication system 100 may further include a second sensor 121 and a second solver 122. Data collected by the second sensor 121 is processed by the second solver 122 as a type of data that matches a data interface corresponding to the second sensor. The second controller 120 supports the data interface corresponding to the second sensor. The first controller 110 does not support the data interface corresponding to the second sensor.

The second controller 120 can obtain, through the data interface corresponding to the second sensor, the data that is output by the solver 122 and that is from the second sensor 121.

It can be learned that, in such an architecture, the first controller 110 supports the data interface corresponding to the first sensor 111, and can obtain data from the first sensor 111 from the first solver 112. However, the second controller 120 does not support the data interface corresponding to the first sensor 111, and the second controller 120 cannot obtain the data from the first sensor 111 from the first solver 112. Similarly, the first controller 110 cannot obtain data from the second sensor 121 from the second solver 122.

For example, the first sensor 111 is a camera. If the second controller 120 needs to use data of the camera, but the second controller 120 does not support the data interface corresponding to the first sensor 111, a new camera needs to be arranged. The camera may be referred to as a second sensor, and a data interface corresponding to the second sensor is supported by the second controller 120. It is clearly that, in such a solution, two cameras are disposed in an in-vehicle system, which causes sensor redundancy.

Figure 1C:
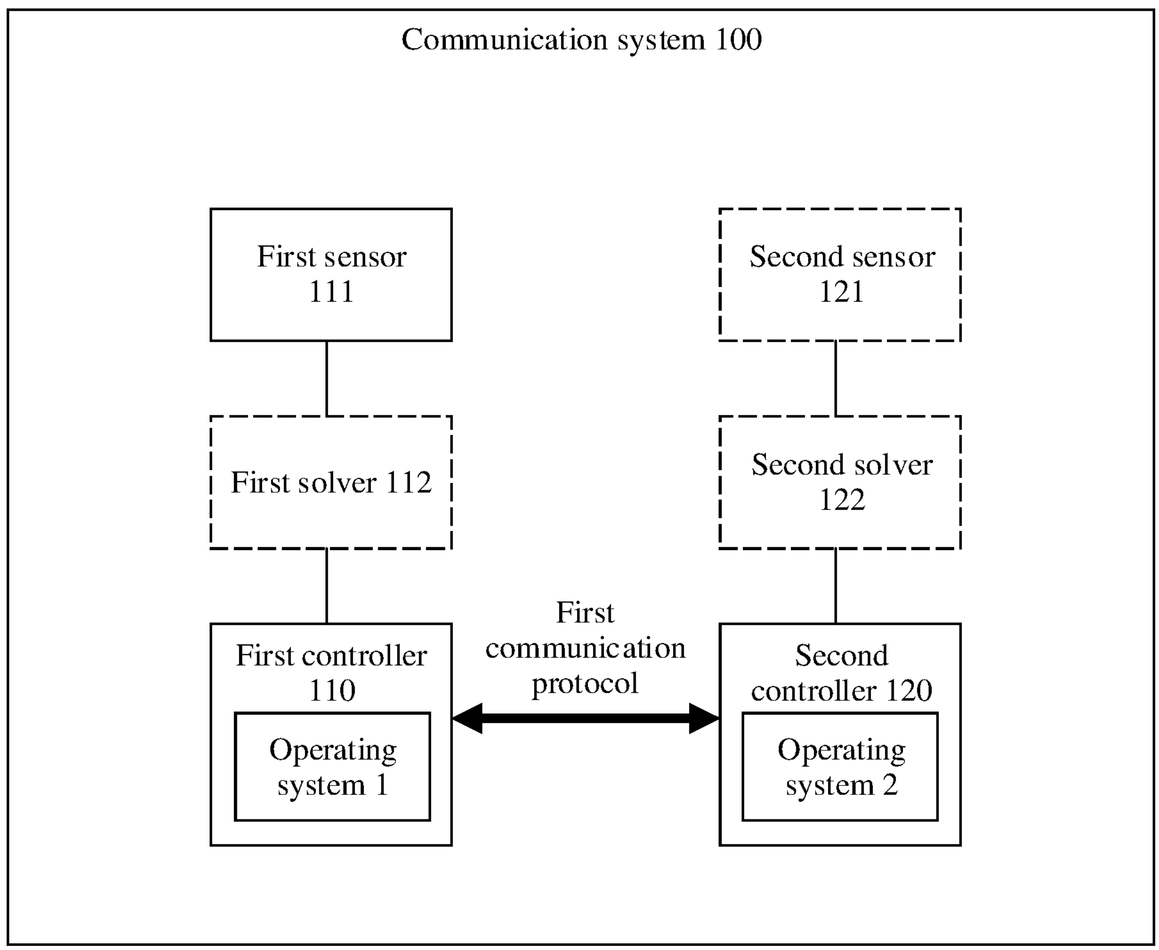

As shown in a schematic diagram of an architecture of a communication system in FIG. 1C. In a technical solution of this application, the first controller 110 may send the data of the first sensor 111 to the second controller 120 according to a first communication protocol. Correspondingly, the second controller 120 may also send the data of the second sensor 121 to the first controller 110 according to the first communication protocol. The first communication protocol is a communication protocol supported by both the first controller 110 and the second controller 120.

It can be learned that, in such a solution, the second controller may obtain the data of the first sensor from the first controller, and the first controller may also obtain the data of the second sensor from the second controller. This helps avoid redundant sensor configuration, and does not need to reconstruct hardware of the in-vehicle system.

The first controller 110 and the second controller 120 may be respectively controllers corresponding to two different control domains in the system in FIG. TA.

For example, the first controller 110 may be any one in an MDC, a CDC, or a VDC, and the second controller 120 may be one of the MDC, the CDC, or the VDC that is different from the first controller 110.

Certainly, the first controller 110 and the second controller 120 are not limited to the foregoing example types, and may alternatively be other types.

Figure 2:
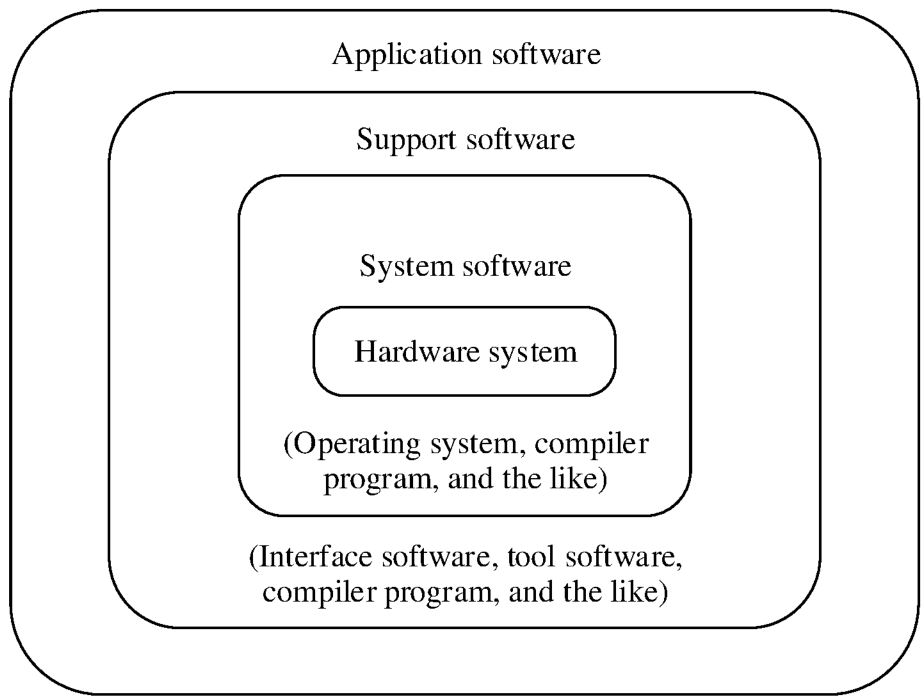
FIG. 2 is a schematic diagram of a software architecture of a controller according to an embodiment of this application.

FIG. 2 is a schematic diagram of a software architecture of a controller. The architecture may be used for a first controller and/or a second controller. The software architecture of the controller can be divided into a system software layer, a support software layer, and an application software layer. The system software layer includes an operating system, a compiler program, and the like that are run by a hardware system of the controller. The support software layer includes interface software, tool software, a compiler program, and the like. The application software layer includes a plurality of applications, and is configured to implement some service functions.

The following describes the technical solutions of this application in detail with reference to data transmission methods provided in embodiments of this application.

Figure 3:
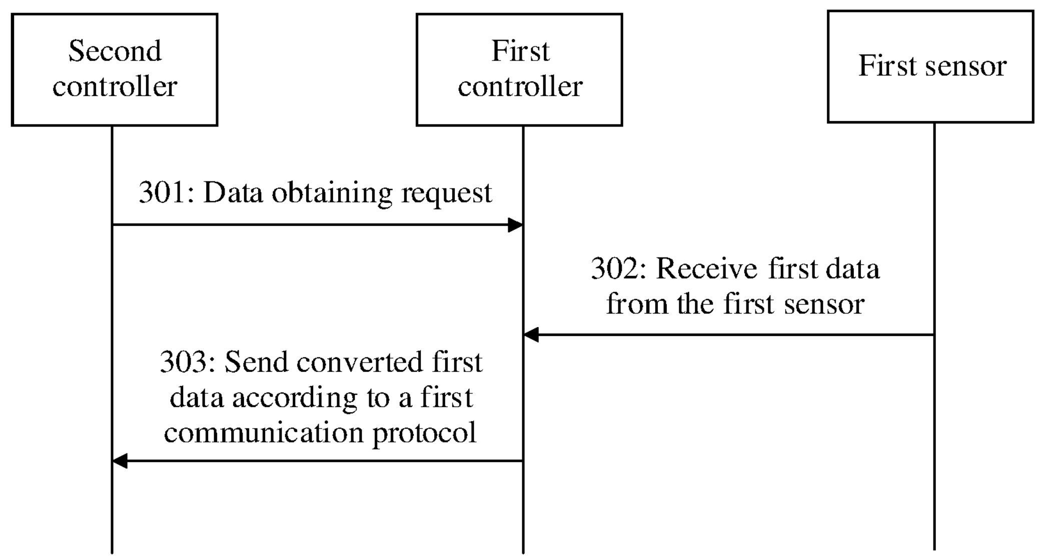
FIG. 3 is a schematic flowchart of a data transmission method according to an embodiment of this application.

As shown in a schematic flowchart in FIG. 3, a data transmission method in an embodiment of this application includes the following steps.

301: A second controller sends a data obtaining request to a first controller.

The data obtaining request requests to obtain data of the first sensor. The first controller supports a data interface corresponding to the first sensor, and the second controller does not support the data interface corresponding to the first sensor.

Correspondingly, the first controller receives the data obtaining request from the second controller.

302: The first controller receives first data from a first sensor.

Optionally, the first controller may receive the first data from the first sensor from a first solver.

The first solver is connected to the first sensor. The first data is obtained by the first solver by performing solving on the data collected by the first sensor. For example, the first solver processes the data collected by the first sensor into data that is consistent with the data interface corresponding to the first sensor. In this way, the first controller can obtain the first data from the first sensor from the first solver through the data interface corresponding to the first sensor.

The first controller may obtain the first data from the first solver through the data interface corresponding to the first sensor.

303: The first controller sends converted first data to the second controller according to a first communication protocol.

Correspondingly, the second controller receives data from the first sensor from the first controller according to the first communication protocol.

It may be understood that the data that is from the first sensor and that is received by the second controller from the first sensor is the converted first data. The converted first data is obtained by the first controller by performing conversion on the first data according to the first communication protocol.

The first communication protocol is a communication protocol supported by both the first controller and the second controller. The first controller and the second controller may transmit data of a sensor between each other according to the first communication protocol.

The second controller receives the data from the first sensor from the first controller, and parses the received data according to the first communication protocol.

The first communication protocol may be, for example, a general streaming protocol, but is not limited to a real-time streaming protocol (RTSP), and may be, for example, but is not limited to one of a real-time transport protocol (RTP), a user datagram protocol (UDP), or a transmission control protocol (TCP).

It can be learned that in the data transmission method in this embodiment of this application, when the first controller supports the data interface corresponding to the first sensor, and the second controller does not support the data interface corresponding to the first sensor, the second controller sends the data obtaining request to the first controller. The first controller may send the data obtained based on the data collected by the first sensor to the second controller according to the first protocol in response to the data obtaining request sent by the second controller. In this way, the second controller can receive the data from the first controller. This helps simplify hardware configuration of an in-vehicle system and avoid redundant sensor configuration.

In this solution, both the first controller and the second controller can use the data of the first sensor. It may also be understood that a plurality of controllers may use data collected by a same sensor. In this way, same sensors or sensors of a same type may be avoided from being repeatedly disposed. This can effectively reduce a quantity of sensors and can reduce hardware costs.

Optionally, before step 302, after the first controller receives the data obtaining request of the second controller, the first controller may first determine whether the second controller supports a data interface corresponding to the first data.

If the first controller determines that the second controller does not support the data interface corresponding to the first data, steps 302 and 303 are performed. The first controller receives the first data from the first sensor, and sends converted first data to the second controller according to the first communication protocol.

If the first controller determines that the second controller supports the data interface corresponding to the first data, the first controller may send an instruction to the second controller, to instruct the second controller to receive data from the first sensor from a first solver through the data interface corresponding to the first data.

Alternatively, if the first controller determines that the second controller supports the data interface corresponding to the first data, the first sensor sends an instruction to a first solver, to instruct the first solver to send the data of the first sensor to the second controller.

It can be learned that in such a solution, when the second controller does not support the data interface corresponding to the first data, the second controller obtains the data from the first sensor through the first controller. The first controller may be understood as an "intermediate" for data transmission. When the second controller supports the data interface corresponding to the first data, the second controller may directly receive the data from the first sensor from the first solver connected to the first sensor through the data interface corresponding to the first data.

Figure 4:
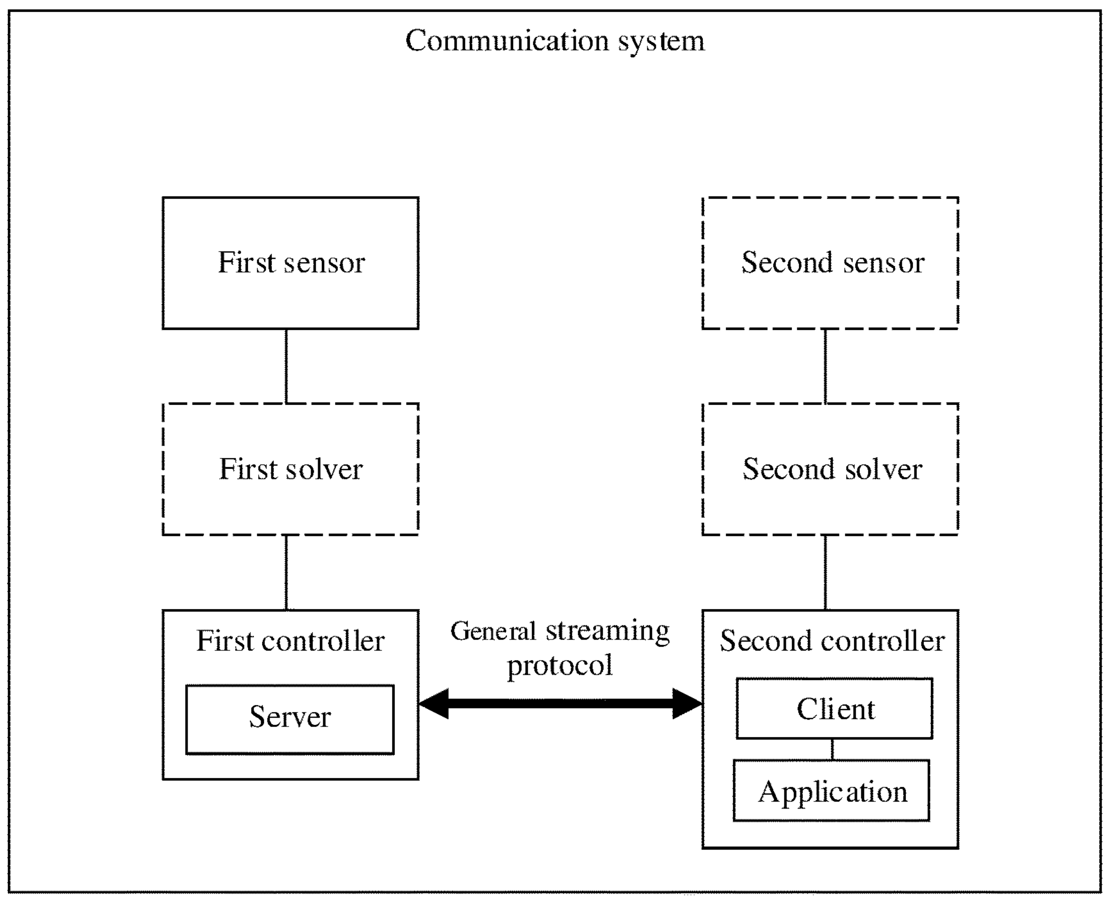
FIG. 4 is a schematic diagram of an architecture of another communication system according to an embodiment of this application.

FIG. 4 is a schematic diagram of an architecture of a communication system. A first controller and a second controller may transmit data according to a first communication protocol. A client runs on the second controller. The client may be understood as, for example, a data transmission client. Alternatively, if the first communication protocol is a general streaming protocol, the client may be understood as a client based on a general streaming media protocol (RTSP client). A server is deployed in the first controller. The server may be understood as a data transmission server, or may be understood as an RTSP-based server (RTSP server). The client is configured to listen to a request that is sent by an application and that is used to obtain data.

In the embodiment shown in FIG. 4, an application is an application program on the first controller. In another embodiment, the application may also be an application that runs on another electronic device that establishes a communication connection to the second controller. The server is configured to process a data obtaining request sent by a client.

Figure 5:
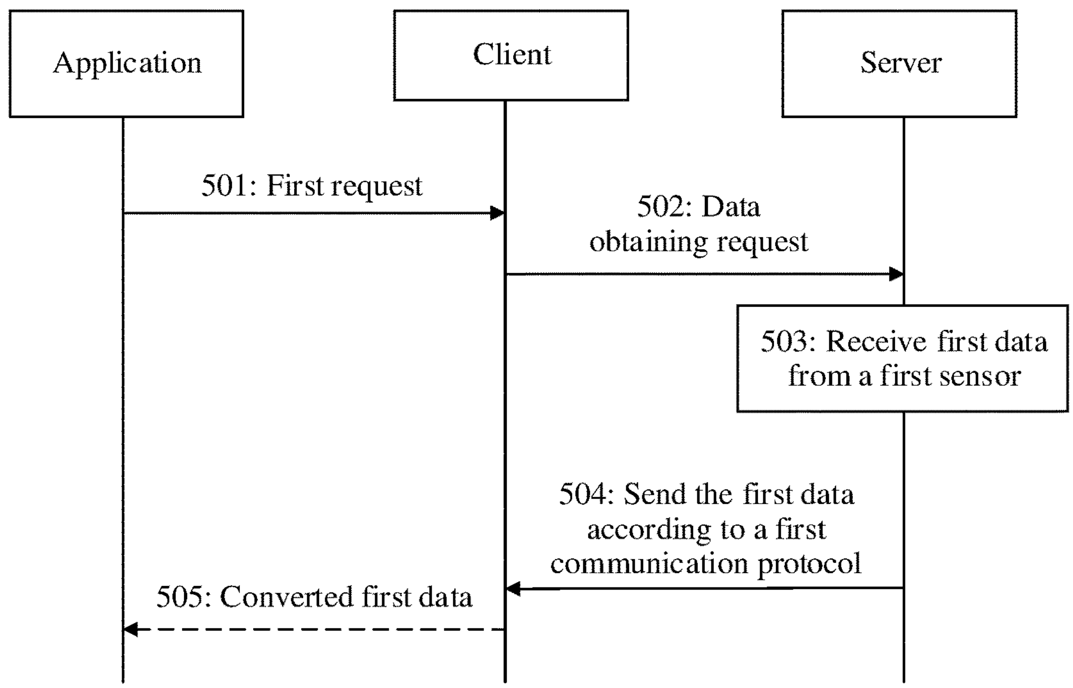
FIG. 5 is a schematic flowchart of another data transmission method according to an embodiment of this application.

As shown in a schematic flowchart in FIG. 5, a data transmission method in another embodiment of this application includes the following steps.

501: A client obtains a first request sent by an application, where the first request requests to obtain data of a first sensor.

The data of the first sensor may be data collected by the first sensor, or may be data obtained based on data collected by the first sensor.

For example, the first sensor may be, for example, but is not limited to, a camera. A second controller may be a cockpit domain controller (CDC), and the application may be a dashboard camera application, a smart camera application, or the like.

Figure 6:
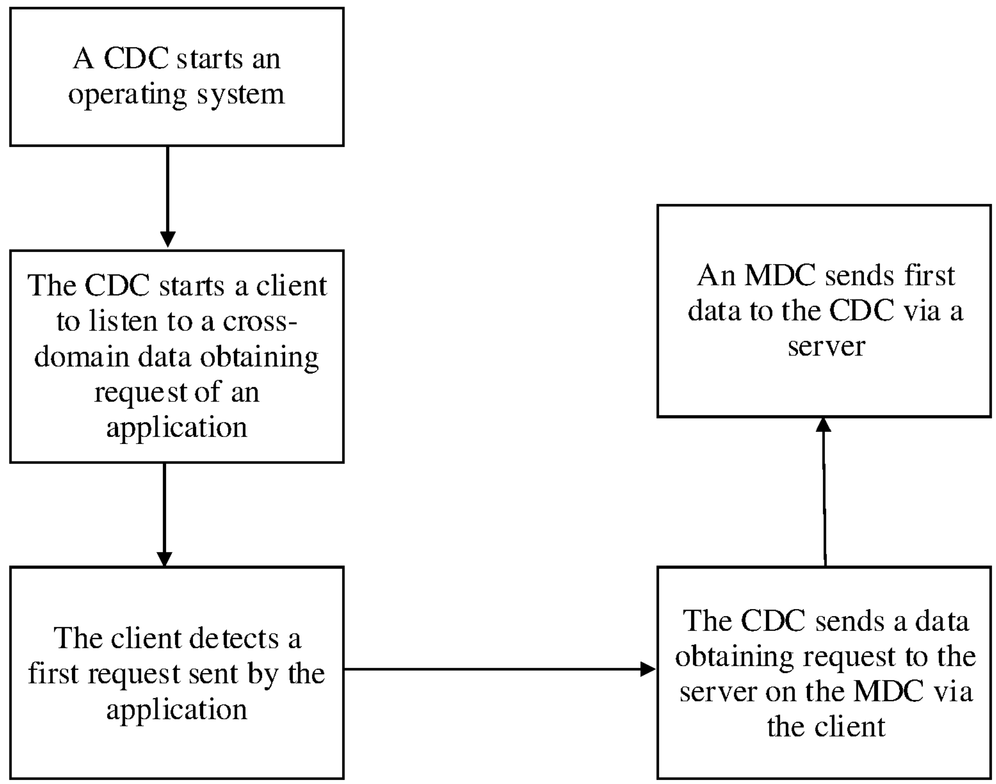
FIG. 6 is a schematic flowchart of another data transmission method according to an embodiment of this application.

The CDC may run an operating system. As shown in a schematic flowchart in FIG. 6, a cockpit domain controller (CDC) starts an operating system. The operating system may be, for example, but is not limited to, HarmonyOS, Android, or Linux.

The first request may include indication information indicating first data or indication information indicating the first sensor.

502: The client sends a data obtaining request to a server deployed in a first controller, where the data obtaining request requests to obtain the data of the first sensor.

The client running on the second controller sends the data obtaining request to the server based on the first request. The data obtaining request may include the indication information indicating first data or the indication information indicating the first sensor.

When receiving the first request, the client may first determine whether the second controller supports a data interface corresponding to the first sensor requested by the first request.

If the second controller does not support the data interface corresponding to the first sensor, the client sends the data obtaining request to the server deployed in the first controller, to request to obtain the data of the first sensor from the first controller.

If the second controller supports the data interface corresponding to the first sensor, the client may instruct the application to directly obtain the data of the first sensor from a solver of the first sensor through the data interface corresponding to the first sensor; or the client may obtain the data of the first sensor from a solver of the first sensor through the data interface corresponding to the first sensor, and then send the data of the first sensor to the application.

The first controller may be, for example, but is not limited to, an autonomous driving domain controller (MDC).

503: The server receives first data from the first sensor.

Optionally, the server deployed in the first controller may receive the first data from the first sensor from a first solver.

The first solver is connected to the first sensor. The first data is obtained by the first solver by performing solving on the data collected by the first sensor. For example, the first solver processes the data collected by the first sensor into data that is consistent with the data interface corresponding to the first sensor.

The server may obtain the first data from the first solver through the data interface corresponding to the first sensor.

504: The server sends converted first data to the client according to a first communication protocol.

For example, the server deployed in a multi domain controller obtains the first data obtained based on data output by the first sensor, converts the first data according to the first communication protocol, to obtain converted first data, and then sends the converted first data to the client.

Optionally, the data transmission method further includes:

505: The client sends the first data to the application.

It can be learned that, in such a solution, when an application running on the second controller or an application that establishes a communication connection to the second controller needs to obtain the data of the first sensor, the application running on the second controller or the application that establishes a communication connection to the second controller may send the first request to the client running on the second controller, and then the client requests the data of the first sensor from the server deployed in the first controller.

For example, the first sensor is a camera. If a dashboard camera application runs on the second controller, the dashboard camera application needs to obtain data of the camera, and the dashboard camera application may send the first request to the client. The client sends, based on the first request, the data obtaining request to the server deployed in the first controller. The server deployed in the first controller obtains the data of the camera from the first solver through a data interface corresponding to the camera, converts the data of the camera according to a general streaming protocol, and then sends the converted data of the camera to the client. The dashboard camera application sends the converted data of the camera to the client. In this way, the dashboard camera application obtains data from the camera from the first controller via the client, thereby avoiding repeated deployment of cameras.

Figure 7:
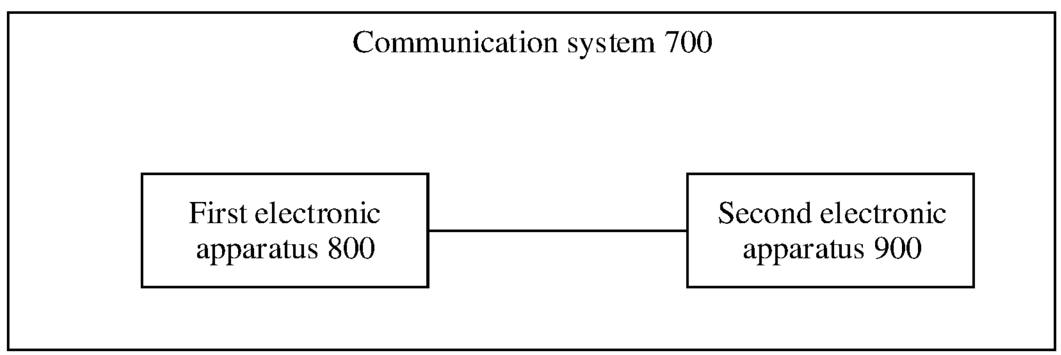
FIG. 7 is a schematic diagram of an architecture of another communication system according to an embodiment of this application.

An embodiment of this application further provides a communication system 700. FIG. 7 is a schematic diagram of an architecture of a communication system. The communication system 700 in this embodiment of this application includes a first electronic apparatus 800 and a second electronic apparatus 900.

Figure 8:
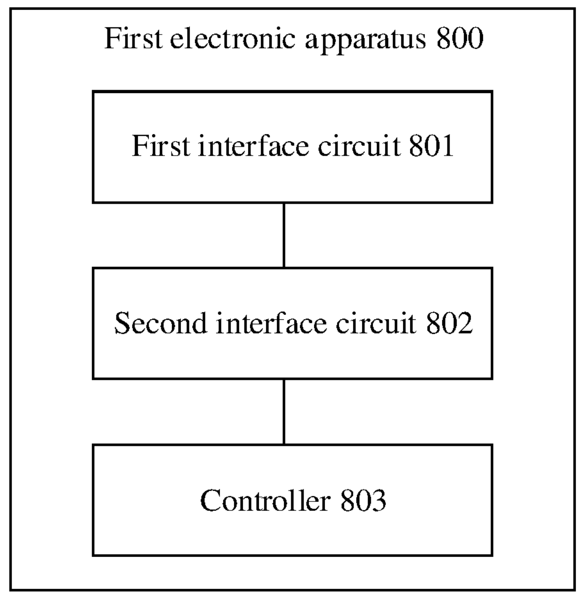
FIG. 8 is a schematic diagram of a structure of a first electronic apparatus according to an embodiment of this application.

FIG. 8 is a schematic diagram of a structure of first electronic apparatus 800. The first electronic apparatus 800 includes a first interface circuit 801, a second interface circuit 802, and a controller 803. The first electronic apparatus 800 may be the first controller 110 in the embodiment corresponding to FIG. 2. Alternatively, the first electronic apparatus 800 may include the first controller 110. Alternatively, the first electronic apparatus 800 may be a chip or a chip system, or may be an independent electronic device.

Alternatively, the first interface circuit 801 and the second interface circuit 802 may be a transceiver unit or may be deployed in a transceiver.

Alternatively, the first interface circuit 801 and the second interface circuit 802 may be communication interfaces.

The first interface circuit 801 is configured to receive a data obtaining request from a second electronic apparatus 900, the data obtaining request requests to obtain data of a first sensor, and the second electronic apparatus 900 does not support a protocol of a data interface of the first sensor.

The second interface circuit 802 is configured to receive first data from the first sensor.

In terms of the controller 803, in a possible implementation, the controller 803 is configured to enable the first interface circuit 801 to send converted first data to the second electronic apparatus 900 according to a first communication protocol.

In another possible implementation, the controller 803 is configured to convert the first data into second data according to the first communication protocol, where the second electronic apparatus 900 supports a protocol corresponding to the second data. The first interface circuit 801 is further configured to send the second data to the second electronic apparatus 900.

In this embodiment of this application, the first electronic apparatus 800 may send the second data or converted data obtained based on the data of the first sensor to the second electronic apparatus according to a first protocol in response to the data obtaining request sent by the second electronic apparatus 900. In this way, the second electronic apparatus can obtain data from the first sensor from the first electronic apparatus. This helps simplify hardware configuration of an in-vehicle system and avoid redundant sensor configuration.

Figure 9:
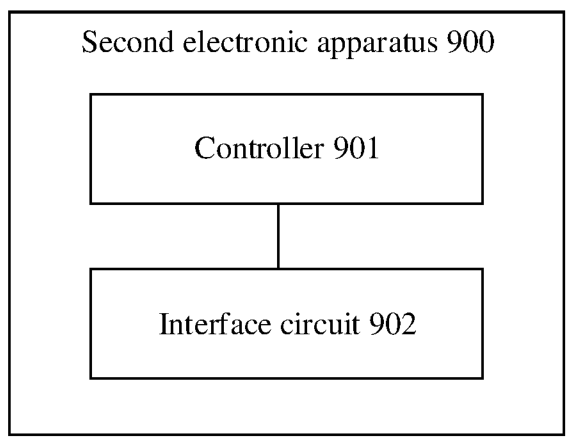
FIG. 9 is a schematic diagram of a structure of a second electronic apparatus according to an embodiment of this application.

FIG. 9 is a schematic diagram of a structure of a second electronic apparatus 900. The second electronic apparatus 900 includes a controller 901 and an interface circuit 902. The second electronic apparatus 900 may be the second controller 120 in the embodiment corresponding to FIG. 2. Alternatively, the second electronic apparatus 900 may include the second controller 120. Alternatively, the second electronic apparatus 900 may be a chip or a chip system, or may be an independent electronic device.

The controller 901 is configured to enable the interface circuit 902 to send a data obtaining request to a first electronic apparatus 800. The data obtaining request requests to obtain data of a first sensor, and the second electronic apparatus 900 does not support a protocol of a data interface of the first sensor.

The controller 901 is further configured to receive converted first data or second data from the first electronic apparatus 800 through the interface circuit 902.

In this embodiment of this application, when the second electronic apparatus 900 does not support the data interface corresponding to the first sensor, the second electronic apparatus 900 can obtain the data from the first sensor from the first electronic apparatus 800 by sending the data obtaining request to the first electronic apparatus 800. This helps simplify hardware configuration of an in-vehicle system and avoid redundant sensor configuration.

It can be seen that the solution of the foregoing data transmission method may be applied to the first electronic apparatus 800 and the second electronic apparatus 900, or steps of the foregoing data transmission method may be implemented by the first electronic apparatus 800 and the second electronic apparatus 900.

For example, in terms of the foregoing step 301, the controller 901 of the second electronic apparatus 900 may send a data obtaining request to the first electronic apparatus 800. Correspondingly, the first interface circuit 801 of the first electronic apparatus 800 receives the data obtaining request from the controller 901. In terms of the foregoing step 302, the second interface circuit 802 of the first electronic apparatus 800 may receive the first data from the first sensor. In terms of the foregoing step 303, the controller 803 of the first electronic apparatus 800 may enable the first interface circuit 801 to send the converted first data to the second electronic apparatus 900 according to the first communication protocol. Alternatively, the controller 803 converts the first data into the converted first data (that is, the second data) according to the first communication protocol, and the first interface circuit 801 sends the converted first data to the second electronic apparatus 900.

It may be understood that the converted first data is obtained by converting the first data from the first sensor, and the converted first data may also be understood as the data of the first sensor.

It can be seen that, in such a solution, the second electronic apparatus 900 that does not support the data interface corresponding to the first sensor may obtain the data of the first sensor by using the first electronic apparatus 800 that supports the data interface corresponding to the first sensor, thereby avoiding repeated deployment of sensors.

It should be understood that related supplementary descriptions and technical effects of the foregoing embodiments of the data transmission method are also applicable to the first electronic apparatus 800 and the second electronic apparatus 900 in this embodiment, and are not described herein again.

Figure 10:
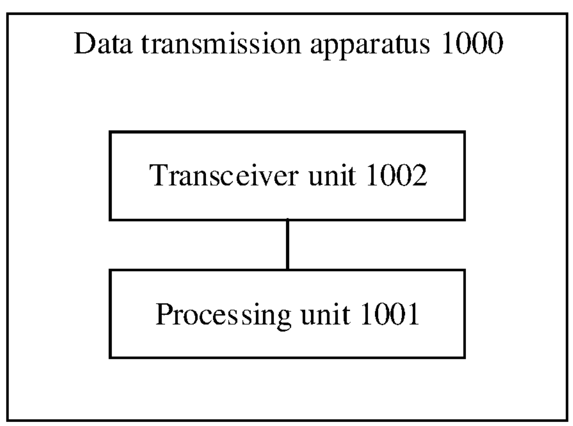
FIG. 10 is a schematic diagram of modules of a data transmission apparatus according to an embodiment of this application.

FIG. 10 is a schematic diagram of modules of a data transmission apparatus 1000. This application further provides the data transmission apparatus 1000, including a transceiver unit 1002 and a processing unit 1001. The processing unit 1001 is configured to control the transceiver unit 1002 to:

receive a data obtaining request from a second controller, where the data obtaining request requests to obtain data of a first sensor, the data transmission apparatus 1000 supports a data interface corresponding to the first sensor, and the second controller does not support the data interface corresponding to the first sensor;

receive first data from the first sensor; and send converted first data to the second controller according to a first communication protocol.

In the technical solution of this application, the data transmission apparatus 1000 may send the converted data obtained based on the data of the first sensor to the second controller according to a first protocol in response to the data obtaining request sent by the second controller. In this way, the second controller can obtain data from the first sensor from the first controller. This helps simplify hardware configuration of an in-vehicle system and avoid redundant sensor configuration.

It may be understood that the data transmission apparatus 1000 may be or may be deployed in the first controller in the foregoing communication system.

In some implementations, in terms of receiving the first data from the first sensor, the transceiver unit 1002 is configured to:

obtain the first data from a first solver through the data interface corresponding to the first sensor, where the first data is obtained by the first solver by performing solving on data collected by the first sensor.

In some implementations, the first communication protocol is one of a real-time streaming protocol, a real-time transport protocol, a user datagram protocol, or a transmission control protocol.

It should be understood that the foregoing related supplementary descriptions and technical effects of the data transmission method are also applicable to the data transmission apparatus 1000, and details are not described herein again.

Figure 11:
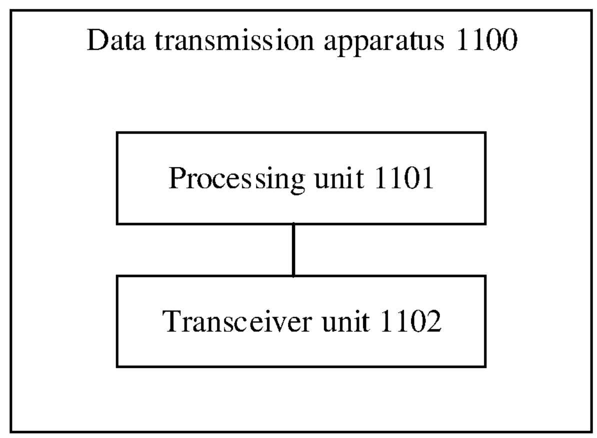
FIG. 11 is another schematic diagram of modules of a data transmission apparatus according to an embodiment of this application.

FIG. 11 is a schematic diagram of modules of a data transmission apparatus 1100. This application further provides the data transmission apparatus 1100, including a transceiver unit 1102 and a processing unit 1101. The processing unit 1101 is configured to control the transceiver unit 1102 to:

send a data obtaining request to a first controller, where the data obtaining request requests to obtain data of a first sensor, the first controller supports a data interface corresponding to the first sensor, and the data transmission apparatus 1100 does not support the data interface corresponding to the first sensor; and receive data from the first controller according to a first communication protocol.

According to the technical solution of this application, when the data transmission apparatus 1100 does not support the data interface corresponding to the first sensor, the data transmission apparatus 1100 can obtain the data from the first sensor from the first controller by sending the data obtaining request to the first controller. This helps simplify hardware configuration of an in-vehicle system and avoid redundant sensor configuration.

It may be understood that the data transmission apparatus 1100 may be or may be deployed in the second controller in the foregoing communication system.

In some implementations, the first communication protocol is one of a real-time streaming protocol, a real-time transport protocol, a user datagram protocol, or a transmission control protocol.

It should be understood that the foregoing related supplementary descriptions and technical effects of the data transmission method are also applicable to the data transmission apparatus, and details are not described herein again.

Figure 12:
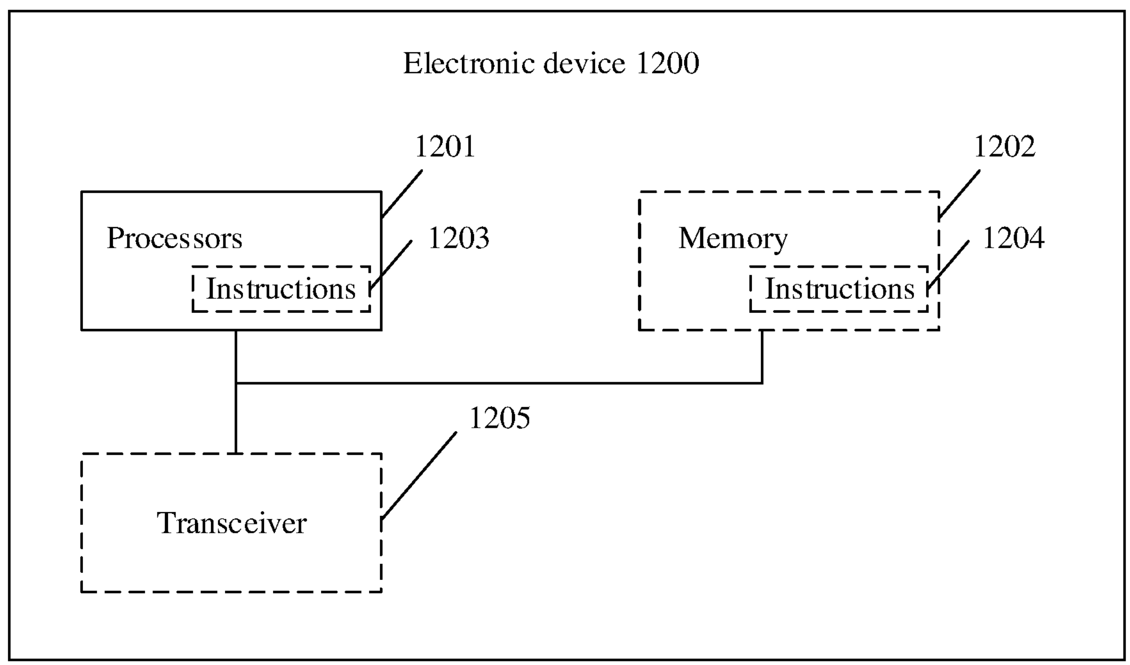
FIG. 12 is a schematic diagram of a structure of an electronic device according to an embodiment of this application.

A related function of the first controller or the second controller in embodiments of this application may be implemented by using an electronic device 1200 in FIG. 12. FIG. 12 is a schematic diagram of a structure of the electronic device 1200 according to an embodiment of this application. As shown in FIG. 12, the electronic device 1200 may include a processor 1201 and a transceiver 1205, and optionally further include a memory 1202.

The transceiver 1205 may be referred to as a transceiver unit, a transceiver, a transceiver circuit, or the like, and is configured to implement a transceiver function. The transceiver 1205 may include a receiver and a transmitter. The receiver may be referred to as a receiver, a receiver circuit, a receiving unit, or the like, and is configured to implement a receiving function. The transmitter may be referred to as a transmitter, a transmitting circuit, a transmitting unit, or the like.

The memory 1202 may store a computer program, software code, or instructions 1204, and the computer program, the software code, or the instructions 1204 may also be referred to as firmware. The processor 1201 may control a MAC layer and a PHY layer by running a computer program, software code, or instructions 1203, or by invoking the computer program, the software code, or the instructions 1204 stored in the memory 1202, to implement a signal transmission method provided in the following embodiments of this application. The processor 1201 may be a central processing unit (CPU), and the memory 1202 may be, for example, a read-only memory (ROM), or a random access memory (RAM).

The processor 1201 and the transceiver 1205 that are described in this application may be implemented on an integrated circuit (IC), an analog IC, a radio frequency integrated circuit RFIC, a mixed-signal IC, an application-specific integrated circuit (ASIC), a printed circuit board (PCB), an electronic device, or the like.

Modules included in the electronic device 1200 are only an example for description, and this is not limited in this application.

As described above, the electronic device 1200 described in the foregoing embodiment may be a first controller or a second controller. However, a scope of the electronic device described in this application is not limited thereto, and a structure of the electronic device may not be limited by FIG. 12. The electronic device may be an independent device, or a part of a large device. For example, an implementation form of the electronic device may be:

(1) an independent integrated circuit IC, a chip, a chip system, or a subsystem; (2) a set including one or more ICs, where optionally, the set of ICs may also include a storage component for storing data and instructions; (3) a module that can be embedded in other devices; (4) a receiver, an intelligent terminal, a wireless device, a handheld device, a mobile unit, a vehicle-mounted device, a cloud device, an artificial intelligence device, or the like; or (5) others.

When an implementation form of the electronic device is a chip or a chip system, the chip includes a processor and an interface. There may be one or more processors, and there may be a plurality of interfaces. The interface is configured to receive and transmit signals. Optionally, the chip or the chip system may include a memory. The memory is configured to store program instructions and data that are necessary for a chip or a chip system.

Embodiments of this application do not limit the protection scope and applicability of the claims. A person skilled in the art may adaptively change functions and deployments of elements in this application, or omit, replace, or add various processes or components as appropriate without departing from the scope of embodiments of this application.

In an implementation, the electronic device 1200 is the first controller in the foregoing method embodiments, and the electronic device 1200 may implement, by using the processor and the transceiver, some or all steps of any method performed by the first controller in embodiments of this application. For example, the processor may be configured to control the transceiver 1205 to:

- receive a data obtaining request from a second controller, where the data obtaining request requests to obtain data of a first sensor, the first controller supports a data interface corresponding to the first sensor, and the second controller does not support the data interface corresponding to the first sensor;
- receive first data from the first sensor; and
- send converted first data to the second controller according to a first communication protocol.

In another implementation, the electronic device 1200 is the second controller in the foregoing method embodiments, and the electronic device 1200 may implement, by using the processor and the transceiver, some or all steps of any method performed by the second controller in embodiments of this application. For example, the processor may be configured to control the transceiver 1205 to:

- send a data obtaining request to a first controller, where the data obtaining request requests to obtain data of a first sensor, the first controller supports a data interface corresponding to the first sensor, and the second controller does not support the data interface corresponding to the first sensor; and
- receive data from the first controller according to a first communication protocol.

It should be understood that the foregoing related supplementary description of the embodiments of the data transmission method is also applicable to the electronic apparatus 1200 in this embodiment, and details are not described herein again.

This application provides a computer-readable storage medium. The computer-readable storage medium stores computer instructions. The computer instructions instruct a server to perform the data transmission method provided in any one of the foregoing implementations.

It should be further understood that “first”, “second”, “third”, “fourth”, and various numbers in this specification are merely used for differentiation for ease of description, and are not intended to limit the scope of this application.

It should be understood that the term “and/or” in this specification describes only an association relationship between associated objects and represents that three relationships may exist. For example, A and/or B may represent the following three cases: Only A exists, both A and B exist, and only B exists. In addition, the character “/” in this specification generally indicates an “or” relationship between the associated objects.

It should be understood that, in various embodiments of this application, sequence numbers of the foregoing processes do not mean execution sequences. The execution sequences of the processes should be determined according to functions and internal logic of the processes, and do not constitute any limitation on implementation processes of embodiments of this application.

A person of ordinary skill in the art may be aware that, in combination with examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief descriptions, for a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, like a USB flash drive, a removable hard disk, a read-only memory (ROM), a random access memory (RAM), a magnetic disk, or an optical disc.

A sequence of the steps of the method in embodiments of this application may be adjusted, combined, or removed based on an actual requirement.

The modules in the apparatus in embodiments of this application may be combined, divided, and deleted based on an actual requirement.

The foregoing embodiments are merely intended for describing the technical solutions of this application, rather than limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A data transmission method, wherein the method comprises:

sending, by an application running on a second controller, a first data request to a client running on the second controller;

receiving, by a server running on a first controller, a data obtaining request from the second controller, wherein the data obtaining request requests to obtain data of a first sensor;

determining, by the first controller, whether the second controller supports a data interface corresponding to the first sensor;

in response to determining that the second controller supports the data interface corresponding to the first sensor, instructing, by the first controller, the second controller to obtain first data of the first sensor through the data interface corresponding to the first sensor; and in response to determining that the second controller does not support the data interface corresponding to the first sensor, receiving, by the first controller, first data from the first sensor; and sending, by the first controller, converted first data to the second controller according to a first communication protocol.

2. The method according to claim 1, wherein the receiving, by the first controller, first data from the first sensor comprises:

obtaining, by the first controller, the first data from a first solver through the data interface corresponding to the first sensor, wherein the first data is obtained by the first solver by performing calculations on data collected by the first sensor.

3. The method according to claim 1, wherein the first communication protocol is one of a real-time streaming protocol, a real-time transport protocol, a user datagram protocol, or a transmission control protocol.

4. A data transmission method according to claim 1, wherein the method further comprises:

sending, by a second controller, a data obtaining request to a first controller, wherein the data obtaining request requests to obtain data of a first sensor, the first controller supports a data interface corresponding to the first sensor, and the second controller does not support the data interface corresponding to the first sensor; and receiving, by the second controller, data from the first controller according to a first communication protocol.

5. The method according to claim 4, wherein the first communication protocol is one of a real-time streaming protocol, a real-time transport protocol, a user datagram protocol, or a transmission control protocol.

6. A first electronic apparatus, comprising a first interface, a second interface circuit, and a controller, wherein an application running on a second electronic apparatus is configured to send a first data request to a client running on the second electronic apparatus;

the first interface is configured to receive, by a server running on the controller, a data obtaining request from the second electronic apparatus, the data obtaining request requests to obtain data of a first sensor;

the controller configured to determine whether the second electronic apparatus supports a protocol of a data interface of the first sensor;

in response to determining that the second electronic apparatus supports the protocol of a data interface of the first sensor, the controller configured to instruct the second electronic apparatus to obtain the data of the first sensor through the data interface corresponding to the first sensor;

in response to determining that the second electronic apparatus does not support the protocol of a data interface of the first sensor the second interface circuit is configured to receive first data from the first sensor; and the controller is configured to enable the first interface to send converted first data to the second electronic apparatus according to a first communication protocol.

7. A first electronic apparatus according to claim 6, comprising a first interface, a second interface, and a controller, wherein the first interface is configured to receive a data obtaining request from a second electronic apparatus, wherein the data obtaining request requests to obtain data of a first sensor;

the second interface is configured to receive first data from the first sensor, wherein the second electronic apparatus does not support a protocol corresponding to the first data;

the controller is configured to convert the first data into second data according to a first communication protocol, wherein the second electronic apparatus supports a protocol corresponding to the second data; and the first interface is further configured to send the second data to the second electronic apparatus.

8. A first electronic apparatus according to claim 6, wherein the first communication protocol is one of a real-time streaming protocol, a real-time transport protocol, a user datagram protocol, or a transmission control protocol.

9. A non-transitory computer-readable storage medium, wherein the computer-readable storage medium stores computer instructions, and an electronic apparatus configured to execute the instructions to cause the electronic apparatus to perform steps, wherein the steps comprise:

sending, by an application running on a second controller, a first data request to a client running on the second controller;

receiving, by a server running on a first controller, a data obtaining request from the second controller, wherein the data obtaining request requests to obtain data of a first sensor;

determining, by the first controller, whether the second controller supports a data interface corresponding to the first sensor;

in response to determining that the second controller supports the data interface corresponding to the first sensor, instructing, by the first controller, the second controller to obtain first data of the first sensor through the data interface corresponding to the first sensor; and in response to determining that the second controller does not support the data interface corresponding to the first sensor, receiving, by the first controller, first data from the first sensor; and sending, by the first controller, converted first data to the second controller according to a first communication protocol.

10. The non-transitory computer-readable storage medium according to claim 9, further storing steps comprising:

obtaining, by the first controller, the first data from a first solver through the data interface corresponding to the first sensor, wherein the first data is obtained by the first solver by performing solving on data collected by the first sensor.

11. The non-transitory computer-readable storage medium according to claim 9, further storing steps comprising:

wherein the first communication protocol is one of a real-time streaming protocol, a real-time transport protocol, a user datagram protocol, or a transmission control protocol.

12. The non-transitory computer-readable storage medium according to claim 9, further storing steps comprising:

sending, by a second controller, a data obtaining request to a first controller, wherein the data obtaining request requests to obtain data of a first sensor, the first controller supports a data interface corresponding to the first sensor, and the second controller does not support the data interface corresponding to the first sensor; and receiving, by the second controller, data from the first controller according to a first communication protocol.

* * * * *